United States Patent
Nakajima et al.

(10) Patent No.: US 11,284,638 B2
(45) Date of Patent: Mar. 29, 2022

(54) BEVERAGE CONTAINING CATECHIN COMPOUND(S) AND REBD AND/OR REBM

(71) Applicant: SUNTORY HOLDINGS LIMITED, Osaka (JP)

(72) Inventors: Makoto Nakajima, Kanagawa (JP); Yasuyuki Kobayashi, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 30 days.

(21) Appl. No.: 16/839,680

(22) Filed: Apr. 3, 2020

(65) Prior Publication Data
US 2020/0229476 A1 Jul. 23, 2020

Related U.S. Application Data

(63) Continuation of application No. 15/555,787, filed as application No. PCT/JP2017/013545 on Mar. 31, 2017, now Pat. No. 10,645,964.

(30) Foreign Application Priority Data

Mar. 31, 2016 (JP) .................. 2016-072709

(51) Int. Cl.
*A23L 2/60* (2006.01)
*A23L 27/00* (2016.01)
(Continued)

(52) U.S. Cl.
CPC ............... *A23L 27/84* (2016.08); *A23F 3/16* (2013.01); *A23F 3/163* (2013.01); *A23L 2/52* (2013.01);
(Continued)

(58) Field of Classification Search
CPC ...... A61K 31/05; A61K 36/82; A61K 9/0095; A23V 2002/00; A23V 2250/258;
(Continued)

(56) References Cited

U.S. PATENT DOCUMENTS 9,169,285 B2 10/2015 Prakash et al.
10,264,811 B2 4/2019 Shi et al.
(Continued)

FOREIGN PATENT DOCUMENTS

CN 108289487 A 7/2018
FR 3012294 5/2015
(Continued)

OTHER PUBLICATIONS

International Search Report (ISR) and Written Opinion for PCT/JP2017/013545, dated Jun. 20, 2017.
(Continued)

*Primary Examiner* — Hong T Yoo
(74) *Attorney, Agent, or Firm* — Greenblum & Bernstein, P.L.C.

(57) ABSTRACT

Catechin compound(s)-containing beverages having reduced bitterness and astringency of catechin compound(s) while maintaining tea-like preferable flavors, methods of production thereof, and the like are provided. The content of catechin compound(s) in a beverage is adjusted to within a certain range, the total content of RebM and RebD in the beverage is adjusted to within a certain range, and the weight ratio of the total content of RebD and RebM to the content of the catechin compound(s) is adjusted to within a certain range.

14 Claims, 2 Drawing Sheets

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Catechin compound(s) (ppm) (A) | 60 | 100 | 400 | 300 | 250 | 210 | 230 | 230 | 600 | 10 |
| RebD (ppm) (B) | 180 | 300 | 180 | 140 | 180 | 140 | 100 | 300 | 300 | 20 |
| B/A | 3.00 | 3.00 | 0.45 | 0.47 | 0.72 | 0.67 | 0.43 | 1.30 | 0.50 | 2.00 |
| Masking effect on bitterness and astringency | ○ | ○ | ○ | ○ | ○ | ○ | ○ | ○ | ○ | ○ |
| Tea-like flavor | ○ | ○ | ○ | ○ | ◎ | ◎ | ○ | ○ | ○ | ○ |

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Catechin compound(s) (ppm) (A) | 100 | 200 | 350 | 700 | 10 | 60 | 450 | 450 |
| RebD (ppm) (B) | 330 | 350 | 400 | 250 | 10 | 220 | 180 | 140 |
| B/A | 3.30 | 1.75 | 1.14 | 0.36 | 1.00 | 3.67 | 0.40 | 0.31 |
| Masking effect on bitterness and astringency | × | ○ | ○ | × | × | × | × | × |
| Tea-like flavor | × | × | × | × | × | × | × | × |

|  | Example 13 | Example 14 | Example 15 | Example 16 | Example 17 |
|---|---|---|---|---|---|
| Catechin compound(s) (ppm) (A) | 100 | 230 | 230 | 600 | 10 |
| RebM (ppm) (M) | 300 | 180 | 100 | 300 | 20 |
| M/A | 3.00 | 0.78 | 0.43 | 0.50 | 2.00 |
| Masking effect on bitterness and astringency | ○ | ○ | ○ | ○ | ○ |
| Tea-like flavor | ○ | ◎ | ○ | ○ | ○ |

|  | Comparative Example 11 | Comparative Example 12 | Comparative Example 13 | Comparative Example 14 | Comparative Example 15 |
|---|---|---|---|---|---|
| Catechin compound(s) (ppm) (A) | 100 | 700 | 10 | 60 | 450 |
| RebM (ppm) (M) | 330 | 250 | 10 | 220 | 180 |
| M/A | 3.30 | 0.36 | 1.00 | 3.67 | 0.40 |
| Masking effect on bitterness and astringency | × | × | × | × | × |
| Tea-like flavor | × | × | × | × | × |

(51) Int. Cl.
  *A23L 2/52*  (2006.01)
  *A23L 2/56*  (2006.01)
  *A23L 27/30* (2016.01)
  *A23L 33/105* (2016.01)
  *A23F 3/16*  (2006.01)

(52) U.S. Cl.
  CPC .................. *A23L 2/56* (2013.01); *A23L 2/60* (2013.01); *A23L 27/36* (2016.08); *A23L 33/105* (2016.08); *A23V 2002/00* (2013.01)

(58) Field of Classification Search
  CPC .......... A23V 2250/21; A23V 2250/262; A23V 2250/214; A23V 2250/24; A23V 2200/16; A23V 2250/2132; A23V 2200/30; A23L 33/105; A23L 2/60; A23L 27/30; A23F 3/16; A23F 3/14
  See application file for complete search history.

(56) References Cited

U.S. PATENT DOCUMENTS

| | | |
|---|---|---|
| 2008/0020020 A1 | 1/2008 | Williamson |
| 2008/0226776 A1 | 9/2008 | Roy et al. |
| 2010/0330244 A1 | 12/2010 | Nonaka et al. |
| 2011/0092684 A1 | 4/2011 | Abelyan et al. |
| 2014/0099403 A1 | 4/2014 | Prakash et al. |
| 2014/0271996 A1 | 9/2014 | Prakash et al. |
| 2014/0272068 A1 | 9/2014 | Prakash et al. |
| 2014/0342043 A1 | 11/2014 | Bell et al. |
| 2015/0017284 A1 | 1/2015 | Prakash et al. |
| 2015/0050410 A1 | 2/2015 | Luo et al. |
| 2015/0320101 A1 | 11/2015 | Walton et al. |
| 2015/0327584 A1 | 11/2015 | Shi et al. |
| 2016/0198750 A1 | 7/2016 | Carlson et al. |
| 2017/0006906 A1 | 1/2017 | Jackson et al. |
| 2017/0303574 A1 | 10/2017 | Luo et al. |
| 2017/0362268 A1 | 12/2017 | Carlson et al. |
| 2018/0002306 A1 | 1/2018 | Jiang et al. |
| 2018/0132501 A1 | 5/2018 | Nakajima et al. |
| 2018/0263269 A1 | 9/2018 | Prakash et al. |
| 2019/0014805 A1 | 1/2019 | Markosyan et al. |
| 2019/0183148 A1 | 6/2019 | Nakajima et al. |
| 2019/0328008 A1 | 10/2019 | Higiro et al. |

FOREIGN PATENT DOCUMENTS

| | | |
|---|---|---|
| JP | 2006-042728 | 2/2006 |
| JP | 2010-521178 A | 6/2010 |
| JP | 2012-005483 | 1/2012 |
| JP | 2012-055325 | 3/2012 |
| JP | 2013-507914 A | 3/2013 |
| JP | 2013-169204 | 9/2013 |
| JP | 2015-502404 A | 1/2015 |
| WO | 2008/112966 | 9/2008 |
| WO | 2008/112979 A1 | 9/2008 |
| WO | 2011/046423 A1 | 4/2011 |
| WO | 2011/161027 | 12/2011 |
| WO | 2013/066490 | 5/2013 |
| WO | 2013/096420 A1 | 6/2013 |
| WO | 2014/186250 A1 | 11/2014 |
| WO | 2015/023928 A1 | 2/2015 |
| WO | 2017/170990 A1 | 10/2017 |

OTHER PUBLICATIONS

Henning et al., "Catechin Content of 18 Teas and a Green Tea Extract Supplement Correlates with the Antioxidant Capacity," *Nutrition and Cancer* 45(2):226-235, 2003.
Decision to Grant a Patent issued in JP 2017-537344, dated Aug. 10, 2017.
Prakash et al., "Development of Next Generation Stevia Sweetener: Rebaudioside M" *Foods*, vol. 3, No. 1, Feb. 27, 2014.
EESR of EP App No. 17758419.0 dated Mar. 27, 2019.
International Search Report of PCT/JP2017/013548 dated Jun. 27, 2017.
Extended European Search Report in EP App. No. 17775521.2, dated Nov. 7, 2019.
Office Action in U.S. Appl. No. 16/089,979 dated Dec. 12, 2019.
Chinese Office Action issued in corresponding Chinese Patent Application No. 201780031740.3, dated Jun. 18, 2021 with English machine translation.
Extended European Search Report, European Patent Office, Application No. 20170545.6, dated Aug. 12, 2020.

Figure 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Catechin compound(s) (ppm) (A) | 60 | 100 | 400 | 300 | 230 | 210 | 230 | 230 | 600 | 10 |
| RebD (ppm) (B) | 180 | 300 | 180 | 140 | 180 | 140 | 100 | 300 | 300 | 20 |
| B/A | 3.00 | 3.00 | 0.45 | 0.47 | 0.78 | 0.67 | 0.43 | 1.30 | 0.50 | 2.00 |
| Masking effect on bitterness and astringency | ○ | ○ | ○ | ○ | ○ | ○ | ○ | ○ | ○ | ○ |
| Tea-like flavor | ○ | ○ | ○ | ○ | ◎ | ◎ | ○ | ○ | ○ | ○ |

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Catechin compound(s) (ppm) (A) | 100 | 200 | 350 | 700 | 10 | 60 | 450 | 450 |
| RebD (ppm) (B) | 330 | 350 | 400 | 250 | 10 | 220 | 180 | 140 |
| B/A | 3.30 | 1.75 | 1.14 | 0.36 | 1.00 | 3.67 | 0.40 | 0.31 |
| Masking effect on bitterness and astringency | × | ○ | ○ | × | × | × | × | × |
| Tea-like flavor | × | × | × | × | × | × | × | × |

Figure 2

| | Example 11 | Example 12 | Comparative Example 9 | Comparative Example 10 |
|---|---|---|---|---|
| Catechin compound(s) (ppm) (A) | 230 | 100 | 230 | 100 |
| RebD (ppm) (B) | 180 | 300 | – | – |
| B/A | 0.78 | 3.00 | – | – |
| RebA (ppm) (C) | – | – | 180 | 300 |
| C/A | – | – | 0.78 | 3.00 |
| Masking effect on bitterness and astringency | ○ | ○ | × | × |
| Tea-like flavor | ◎ | ○ | ○ | × |

Figure 3

|  | Example 13 | Example 14 | Example 15 | Example 16 | Example 17 |
|---|---|---|---|---|---|
| Catechin compound(s) (ppm) (A) | 100 | 230 | 230 | 600 | 10 |
| RebM (ppm) (M) | 300 | 180 | 100 | 300 | 20 |
| M/A | 3.00 | 0.78 | 0.43 | 0.50 | 2.00 |
| Masking effect on bitterness and astringency | ○ | ○ | ○ | ○ | ○ |
| Tea-like flavor | ○ | ◎ | ○ | ○ | ○ |

|  | Comparative Example 11 | Comparative Example 12 | Comparative Example 13 | Comparative Example 14 | Comparative Example 15 |
|---|---|---|---|---|---|
| Catechin compound(s) (ppm) (A) | 100 | 700 | 10 | 60 | 450 |
| RebM (ppm) (M) | 330 | 250 | 10 | 220 | 180 |
| M/A | 3.30 | 0.36 | 1.00 | 3.67 | 0.40 |
| Masking effect on bitterness and astringency | × | × | × | × | × |
| Tea-like flavor | × | × | × | × | × |

BEVERAGE CONTAINING CATECHIN COMPOUND(S) AND REBD AND/OR REBM

CROSS-REFERENCE TO RELATED APPLICATIONS

This is a continuation application of U.S. patent Ser. No. 15/555,787, filed on Sep. 5, 2017, which is a U.S National stage of International Patent Application No. PCT/JP2017/013545, filed on Mar. 31, 2017 which claims priority to Japanese Patent Application No. 2016-072709, filed on Mar. 31, 2016. The disclosure of each of these applications is herein incorporated by reference in its entirety.

TECHNICAL FIELD

Embodiments of the present invention relate to a beverage containing catechin compound(s) and RebD and/or RebM.

BACKGROUND ART

Physiological effects of polyphenols have recently attracted attention due to the increase in health consciousness and the demand for polyphenol-rich beverages has increased too. For example, catechin compound(s), which are a type of polyphenols, are known to have an inhibitory effect on increase in cholesterol and there are needs for beverages containing catechin compound(s). However, catechin compound(s) have a characteristic bitter taste and astringency and therefore methods for reducing the bitter taste and astringency have been proposed to make such beverages more drinkable. For example, Patent Literature 1 discloses that astringency characteristic of catechin compound(s) can be suppressed by adjusting the glutamic acid concentration in beverages containing catechin compound(s) within a certain range.

CITATION LIST

Patent Literature

Patent Literature 1: Japanese Patent Laid-Open No. 2006-042728

SUMMARY

Technical Problem

Objects of embodiments of the present invention are to provide catechin compound(s)-containing beverages having reduced bitterness and astringency of catechin compound(s) while maintaining tea-like preferable flavors, methods of production thereof, and the like.

Solution to Problem

Embodiments of the present invention provide beverages comprising catechin compound(s) at a content of 1 to 600 ppm and RebD and/or RebM at a total content of 20 to 300 ppm, wherein a weight ratio (B/A) of a total content (B) of RebD and RebM to a content (A) of the catechin compound(s) is 0.43 to 3.00, but embodiments of the present invention are not limited thereto.

BRIEF DESCRIPTION OF DRAWINGS

FIG. 1 illustrates the results of evaluation of masking effect of a catechin compound(s) content (A) and a RebD content (B) in beverages and a weight ratio (B/A) thereof on bitterness and astringency characteristic of catechin compound(s) and the effect thereof on the tea-like flavor.

FIG. 2 illustrates the results of evaluation of masking effect of RebD and RebA on bitterness and astringency characteristic of catechin compound(s) and the effect thereof on the tea-like flavor.

FIG. 3 illustrates the results of evaluation of masking effect of a catechin compound(s) content (A) and a RebM content (M) in beverages and weight ratio (M/A) thereof on bitterness and astringency characteristic of catechin compound(s) and effect thereof on the tea-like flavor.

DESCRIPTION OF EMBODIMENTS

<Beverage>

Embodiments of the present invention are beverages comprising catechin compound(s) at a content within a certain range and RebD and/or RebM at a total content within a certain range, wherein a weight ratio (B/A) of a total content (B) of RebD and RebM to a content (A) of the catechin compound(s) is within a certain range.

Catechin compound(s) are known to be a type of polyphenols and have a characteristic bitter taste and astringency. As used herein, the bitter taste and astringency characteristic of catechin compound(s) may be described as the "bitterness and astringency".

In embodiments of the invention, the content of catechin compound(s) is 1 to 600 ppm (0.0001 to 0.06% by weight), preferably 30 to 500 ppm, more preferably 60 to 400 ppm, further more preferably 100 to 300 ppm, and particularly preferably 150 to 250 ppm relative to the weight of beverage. Unless otherwise specified, "ppm", as used herein, means weight/weight (w/w) ppm.

As used herein, the "catechin compound(s)" refers to a generic name of catechin, epicatechin, gallocatechin, epigallocatechin, catechin gallate, epicatechin gallate, gallocatechin gallate, and epigallocatechin gallate. Accordingly, in embodiments of the present invention, catechin compound(s) may comprise one or more selected from the group consisting of catechin, epicatechin, gallocatechin, epigallocatechin, catechin gallate, epicatechin gallate, gallocatechin gallate, and epigallocatechin gallate. Stating for confirmation, the content of catechin compound(s) mentioned above means the sum of the contents of the aforementioned 8 compounds.

Moreover, in embodiments of the present invention, the percentage of the total amount of gallocatechin gallate and epigallocatechin gallate relative to the content of catechin compound(s) is preferably 30% or more, more preferably 35% or more, and further more preferably 40% or more.

In embodiments of the present invention, the origin of the catechin compound(s) is not particularly limited. For example, they may be those derived from a natural product, those obtained from the market, or those synthesized by a technique in organic chemistry, but they are preferably catechin compound(s) derived from a natural product in view of a recent increase in nature orientation. Examples of the natural product include, but are not limited to, tea (green tea, white tea, black tea, oolong tea, mate, and the like), chocolate, cocoa, red wine, fruits (grapes, berries, apples), and the like. In embodiments of the present invention, the catechin compound(s) are preferably derived from a tea extract and the tea extract is preferably derived from *Camellia sinensis*.

Rebaudiosides (hereinafter, abbreviated as "Rebs") are known as sweet components contained in stevia extracts.

The stevia extracts are extracts obtained by extraction and/or purification from stevia dry leaves. Stevia is a perennial plant in Asteraceae that is native to Paraguay in South America and its scientific name is Stevia Rebaudiana Bertoni. Because stevia contains components having about 300 times or more the sweetness of sugar, it is grown for extraction and use of these sweet components as a natural sweetener. Known Rebs include RebA, RebB, RebC, RebD, and RebE. Furthermore, the presence of various glycosides such as RebM described in National Publication of International Patent Application No. 2012-504552 has been recently reported. Embodiments of the present invention involve particularly RebM and RebD as stevia extracts. RebD and RebM may be obtained on the market or synthesized by an organic chemical method. Moreover, RebD and RebM may be separated and purified from a stevia extract as a starting raw material. For example, RebD can be purified according to the method described in U.S. Pat. No. 8,414,949 and RebM can be purified according to the method described in Foods 2014, 3 (1), 162-175; doi: 10.3390/foods3010162. Methods for analyzing RebD and RebM are not particularly limited and known methods may be used, but, for example, they can be analyzed with a high performance liquid chromatograph (HPLC) under the conditions described in National Publication of International Patent Application No. 2012-504552. RebD and RebM are analyzed herein by the method, unless otherwise described.

Beverages of embodiments of the present invention may contain one or both of RebD and RebM and the total content of RebD and RebM relative to the weight of the beverage is 20 to 300 ppm (0.002 to 0.03% by weight), preferably 30 to 280 ppm, more preferably 40 to 260 ppm, and further more preferably 50 to 250 ppm.

In embodiments of the present invention, bitterness and astringency characteristic of catechin compound(s) can be reduced while maintaining the tea-like preferable flavor in the catechin compound(s)-containing beverages by adjusting the content of the catechin compound(s) and the total content of RebD and RebM within the ranges described above. In embodiments of the present invention, tastes and aromas of the catechin compound(s) themselves may remain as long as bitterness and astringency characteristic of catechin compound(s) can be reduced. The "tea-like preferable flavor" as used herein refers to having a refreshing aroma and a rich taste characteristic of tea.

Furthermore, in the embodiments, the weight ratio of a total content (B) of RebD and RebM relative to a content (A) of catechin compound(s) ([total content of RebD and RebM]/[content of catechin compound(s)] (B/A)) is 0.43 to 3.00, preferably 0.45 to 2.00, more preferably 0.50 to 1.50, and further more preferably 0.60 to 1.20, and particularly preferably 60 to 0.80. If A and B meet the conditions, then bitterness and astringency of catechin compound(s) can be effectively reduced while maintaining the tea-like preferable flavor in the catechin compound(s)-containing beverages.

Moreover, in beverages of embodiments of the present invention, the content of RebD relative to the weight of the beverage is preferably 20 to 300 ppm (0.002 to 0.03% by weight), more preferably 30 to 280 ppm, further more preferably 40 to 260 ppm, and most preferably 50 to 250 ppm. Furthermore, in embodiments of the present invention, the weight ratio of the content of RebD to the content of catechin compound(s) ([content of RebD]/[content of catechin compound(s)]) is 0.43 to 3.00, preferably 0.45 to 2.00, more preferably 0.50 to 1.50, and further more preferably 0.60 to 1.20, and particularly preferable to be 0.60 to 0.80.

In beverages of an embodiment of the present invention, the content of RebM relative to the weight of the beverage is 20 to 300 ppm (0.002 to 0.03% by weight), more preferably 30 to 280 ppm, further more preferably 40 to 260 ppm, and particularly preferably 50 to 250 ppm. Furthermore, in an embodiment of the present invention, the weight ratio of the content of RebM to the content of catechin compound(s) ([content of RebM]/[content of catechin compound(s)]) is 0.43 to 3.00, preferably 0.45 to 2.00, more preferably 0.50 to 1.50, and further more preferably 0.60 to 1.20, and particularly preferable to be 0.60 to 0.80.

Beverages of embodiments of the present invention may contain, as needed, additives usually contained in beverages, for example, antioxidants, emulsifiers, nutrient supplements (vitamins, calcium, minerals, amino acids), flavors, pigments, preservatives, flavoring agents, extracts, pH regulators, quality stabilizer, fruit juice, fruit juice puree, and the like. These additives may be blended singly in the beverages or a plurality of these components may be blended in combination in the beverages.

Embodiments of the present invention are not particularly limited, but examples include refreshing beverages, non-alcoholic beverages, alcoholic beverages, and the like. The beverages may be beverages containing no carbonic acid gas or may be beverages containing carbonic acid gas. Examples of the beverages containing no carbonic acid gas include, but are not limited to, tea beverages such as green tea, oolong tea, black tea, barley tea, mate, and the like, coffee, fruit juice beverages, milk beverages, sports drinks, and the like. Examples of the beverages containing carbonic acid gas include, but are not limited to, cola, diet cola, ginger ale, soda pop, and carbonated water provided with a fruit juice flavor. In particular, from a point of view to maintain the tea-like preferable flavor, embodiments of the present invention are preferably tea beverages such as green tea, oolong tea, black tea, barley tea, mate, and the like.

Beverages of embodiments of the present invention may be provided in containers, as needed. The form of the containers is not limited at all and the beverages may be filled into containers such as bottles, cans, barrels, or PET bottles and provided as beverages in containers. Moreover, the method of filling the beverages into containers is not particularly limited.

<Method of Production of Beverage and Method of Reducing Bitterness and Astringency of Catechin Compound(s) While Maintaining Tea-Like Preferable Flavor>

According to another aspect of embodiments of the present invention, methods of producing beverages are provided. A method of production according to an embodiment of the present invention comprises the step of blending catechin compound(s) and RebD and/or RebM such that the content of the catechin compound(s) becomes 1 to 600 ppm, the total content of RebD and RebM becomes 20 to 300 ppm, and the weight ratio (B/A) of the total content (B) of RebD and RebM to the content (A) of the catechin compound(s) is 0.43 to 3.00. The method of blending the catechin compound(s) is not particularly limited and, for example, the catechin compound(s) themselves may be blended or a raw material containing the catechin compound(s) may be blended. Moreover, the method of blending RebD and/or RebM is not particularly limited as well and RebD and/or RebM itself may be blended or a raw material containing RebD and/or RebM may be blended. Preferable catechin compound(s) and preferable content ranges thereof, preferable total content ranges of RebD and RebM, and preferable ranges of the weight ratio (B/A) are as described above as for beverages.

The method of production according to the embodiment of the present invention may comprise the step of blending an additive that is usually blended into beverages and/or the step of filling a beverage into a container. Types of the additive and the container are as described above as for beverages and filling of the container may be done by using a known method.

The method of production according to the embodiment of the present invention can reduce bitterness and astringency characteristic of catechin compound(s) while maintaining a tea-like preferable flavor in catechin compound(s)-containing beverages. Accordingly, the method of production is, in another aspect, a method for reducing bitterness and astringency of catechin compound(s) while maintaining a tea-like preferable flavor in a beverage.

Hereinafter, embodiments of the present invention are described referring to specific examples, but the present invention is not limited thereto.

The effect of the catechin compound(s) content (A), RebD and/or RebM content (B) in beverages, and the weight ratio (B/A) thereof on the tea-like preferable flavor and the bitterness and astringency of catechin compound(s) can be determined as follows. First, green tea leaves and black tea leaves (Assam) were mixed at a certain ratio and a catechin formulation (Sunphenon, manufactured by Taiyo Kagaku Co., Ltd. Percentage of the total amount of gallocatechin gallate and epigallocatechin gallate to the total amount of catechin compound(s) was approximately 60%.) and RebD were blended to prepare sample beverages (Examples 1 to 10, Comparative Examples 1 to 8). The catechin compound(s) content and the RebD content in the beverages were measured. Furthermore, based on the catechin compound(s) content (A) and the RebD content (B) measured, the RebD content/catechin compound(s) content weight ratio (B/A) was calculated. Subsequently, a sensuality evaluation test for "masking effect of bitterness and astringency" and "tea-like flavor" by expert panels was conducted by tasting of sample beverages according to the following standards. 5 expert panels conducted the evaluation and graded the samples 1 to 5 points at 0.1 points intervals for the evaluation criteria. x was marked when the average of points by the 5 panels is less than 3; ○ was marked when the average is equal to or more than 3 and less than 4.5: and ⊚ was marked when the average is equal to or more than 4.5.

<Criteria for Sensuality Evaluation>
⊚: very preferable
○: preferable
x: unfavorable The catechin compound(s) content and the RebD content in sample beverages and the results of the sensuality evaluation are illustrated in FIG. 1. It was shown, as described in FIG. 1, that the bitterness and astringency of the catechin compound(s) can be masked while maintaining the tea-like flavor by adjusting the catechin compound(s) content and the RebD content within the range according to the present invention and adjusting the weight ratio of RebD content/catechin compound(s) content within the range according to the present invention.

Furthermore, the difference between the effects of RebD and RebA on the tea-like preferable flavor and the bitterness and astringency of the catechin compound(s) in catechin compound(s)-containing beverages was examined as follows. First, sample beverages (Examples 11 to 12, Comparative Examples 9 to 10) were prepared in the same way as described above. The catechin compound(s) content and the RebA or RebD content in each beverage were measured and the weight ratio of RebA or RebD content/catechin compound(s) content (C/A or B/A) was calculated (FIG. 2). A sensuality evaluation test was conducted according to the method described above. The results are shown in FIG. 2. It was revealed, as described in FIG. 2, that the effect that allows masking bitterness and astringency of the catechin compound(s) while maintaining the tea-like flavor observed with RebD was hardly observed with RebA.

Moreover, sample beverages (Examples 13 to 17, Comparative Examples 11 to 15) were prepared in the same way as described above except that RebM was used instead of RebD. It was also demonstrated that if the catechin compound(s) content, the RebM content, and weight ratio of RebM content/catechin compound(s) content (M/A) were adjusted within the ranges according to the present invention, then the bitterness and astringency of the catechin compound(s) could be masked while maintaining the tea-like flavor, similar to the case with RebD (FIG. 3).

Stating for clarification, the numerical range expressed herein with a lower limit value to an upper limit value, namely, "lower limit value to upper limit value" includes the lower limit value and the upper limit level value. For example, the range expressed as "1 to 2" includes 1 and 2.

The invention claimed is:

1. A beverage comprising:
catechin compound(s) at a content (A) of 10 to 600 ppm, wherein the catechin compound(s) is one or more compounds selected from the group consisting of catechin, epicatechin, gallocatechin, epigallocatechin, catechin gallate, epicatechin gallate, gallocatechin gallate, and epigallocatechin gallate; and
Rebaudioside D (Reb D) at a content (B) of 20 to 300 ppm;
wherein a weight ratio B/A is 0.43 to 3.00.

2. The beverage according to claim 1, wherein the weight ratio B/A is 0.60 to 0.80.

3. The beverage according to claim 2, wherein the catechin compound(s) are derived from a tea extract.

4. The beverage according to claim 3, wherein the tea extract is derived from *Camellia sinensis*.

5. The beverage according to claim 1, wherein the catechin compound(s) are derived from a tea extract.

6. The beverage according to claim 5, wherein the tea extract is derived from *Camellia sinensis*.

7. A tea beverage comprising:
catechin compound(s) at a content (A) of 230 to 600 ppm, wherein the catechin compound(s) is one or more compounds selected from the group consisting of catechin, epicatechin, gallocatechin, epigallocatechin, catechin gallate, epicatechin gallate, gallocatechin gallate, and epigallocatechin gallate; and
Rebaudioside D (RebD) at a content (B) of 20 to 300 ppm;
wherein a weight ratio B/A is 0.43 to 3.00.

8. A beverage comprising:
catechin compound(s) at a content (A) of 10 to 600 ppm, wherein the catechin compound(s) is one or more compounds selected from the group consisting of catechin, epicatechin, gallocatechin, epigallocatechin, catechin gallate, epicatechin gallate, gallocatechin gallate, and epigallocatechin gallate; and
Rebaudioside D (RebD) and Rebaudioside M (RebM) at a total content (B) of 20 to 300 ppm;
wherein a weight ratio B/A is 0.43 to 3.00.

9. The beverage according to claim 8, wherein the weight ratio B/A is 0.60 to 0.80.

10. The beverage according to claim 9, wherein the catechin compound(s) are from a tea extract.

11. The beverage according to claim 10, wherein the tea extract is from *Camellia sinensis*.

12. The beverage according to claim 8, wherein the catechin compound(s) are from a tea extract.

13. The beverage according to claim 12, wherein the tea extract is from *Camellia sinensis*.

14. A tea beverage comprising:
catechin compound(s) at a content (A) of 230 to 600 ppm, wherein the catechin compound(s) is one or more compounds selected from the group consisting of catechin, epicatechin, gallocatechin, epigallocatechin, catechin gallate, epicatechin gallate, gallocatechin gallate, and epigallocatechin gallate; and
Rebaudioside D (RebD) and Rebaudioside M (RebM) at a total content (B) of 20 to 300 ppm;
wherein a weight ratio B/A is 0.43 to 3.00.

* * * * *